United States Patent
Lubbers

(10) Patent No.: US 7,260,681 B2
(45) Date of Patent: Aug. 21, 2007

(54) STRIPE BUFFER LIST

(75) Inventor: Clark Edward Lubbers, Colorado Springs, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 92 days.

(21) Appl. No.: 11/144,468

(22) Filed: Jun. 2, 2005

(65) Prior Publication Data

US 2006/0277350 A1    Dec. 7, 2006

(51) Int. Cl.
*G06F 12/00*    (2006.01)
(52) U.S. Cl. .................................. 711/113; 711/118
(58) Field of Classification Search ................. 711/113
See application file for complete search history.

(56) References Cited

U.S. PATENT DOCUMENTS

| | | | |
|---|---|---|---|
| 5,263,142 A | 11/1993 | Watkins et al. | |
| 6,233,648 B1 | 5/2001 | Tomita | |
| 6,567,889 B1 | 5/2003 | DeKoning et al. | |
| 6,857,059 B2 | 2/2005 | Karpott et al. | |
| 6,904,498 B2 | 6/2005 | Stolowitz | |
| 2003/0149842 A1 | 8/2003 | Kim et al. | |
| 2004/0024952 A1 | 2/2004 | Bains et al. | |
| 2004/0225859 A1 | 11/2004 | Lane | |

*Primary Examiner*—Brian R. Peugh
*Assistant Examiner*—Matthew Bradley
(74) *Attorney, Agent, or Firm*—Fellers, Snider, et al.

(57) ABSTRACT

A storage controller uses a stripe-aligned metadata to describe data buffers in the storage controller's cache. A stripe buffer list and other metadata structures are aligned to stripe boundaries on storage media. Each stripe buffer list references data buffers in the cache memory of the storage controller that are dedicated to storing the data associated with a given disk stripe during a storage transaction. A stripe buffer descriptor table associates each stripe buffer list with the corresponding disk stripe through a virtual block address range and logical disk identifier. A stripe buffer list "present bits" table and a stripe buffer list "dirty bits" table maintain a record of the state of individual data buffers. With these metadata structures, data buffers in cache memory are effectively aligned with virtual disk stripes of the storage media, making for a simpler and more efficient storage transaction.

16 Claims, 7 Drawing Sheets

STRIPE BUFFER LIST

TECHNICAL FIELD

The invention relates generally to storage controllers, and more particularly to stripe buffer lists in storage controllers.

BACKGROUND

Typical computing systems comprise input devices, output devices, one or more central processing units (e.g., CPUs), and storage capacity. The storage capacity may take form in many different types of data storage devices, such as semiconductor memory, magnetic disk drives, and optical drives. An operating system provides an application environment and a file system that allocates or de-allocates storage capacity as files are created, modified, or deleted. Data storage systems, such as data storage arrays, also employ a file system for allocating storage capacity that is accessed through a network or other connection. Servers and storage arrays are serviced by storage controllers that support data storage formats, such as a redundant array of independent drives (RAID), which distribute (e.g., "stripe") stored information across a plurality of data storage devices.

One or more storage controllers typically manage the storage/retrieval of data files to/from one or more storage devices. As files are communicated through a storage controller, the storage controller must direct the data to/from the appropriate locations on the physical storage media. In some storage controllers, this requirement leads to complex caching and mapping constructs to make certain the right data is communicated to the right place. Data that describes the manner in which the data is mapped to cache memory within a storage controller and mapped to proper locations on physical storage media is termed "metadata".

The structure of metadata can significantly impact storage system performance, particularly across different components in the storage system (e.g., host bus adapter (HBA), storage controller, and storage device). One existing implementation employs a scatter-gather list (SGL). For example, in a write operation, an SGL identifies memory buffers to which data is to be written (i.e., "scattered"), and in a read operation, an SGL identifies memory buffers from which memory is to be read (e.g., "gathered"). SGLs are commonly used in Direct Memory Address (DMA) reads and writes. However, simple SGLs are not optimized for use in a striped storage environment, thereby complicating the processing and slowing the performance of each transaction request.

SUMMARY

Implementations described and claimed herein address the foregoing problems by providing a stripe buffer list and other metadata structures that are aligned to stripe boundaries on storage media. Each stripe buffer list references data buffers in cache that are dedicated to storing the data associated with a full disk stripe during a storage transaction. A stripe buffer descriptor table associates the stripe buffer list with the disk stripe through a virtual block address range. A stripe buffer list "present bits" table and a stripe buffer list "dirty bits" table maintain a record of the state of individual data buffers. With these metadata structures, data buffers in cache memory are effectively aligned with virtual disk stripes of the storage media, making for a more simpler and efficient storage transaction.

In one implementation, a method of writing data in a storage transaction to one or more data buffers residing in a cache memory is provided. A stripe buffer list associated with the storage transaction is constructed. The stripe buffer list is aligned with a virtual stripe of a storage device. Each stripe buffer list entry in the stripe buffer list references one of the data buffers residing in the cache memory. A memory address to a data buffer is computed based on one of the stripe buffer list entries. The memory address references a starting data buffer in the cache memory. The data is stored to the starting data buffer at the memory address.

In another implementation, a method of reading data in a storage transaction from one or more data buffers residing in a cache memory is provided. A stripe buffer list associated with the storage transaction is accessed. The stripe buffer list is aligned with a virtual stripe of a storage device. Each stripe buffer list entry in the stripe buffer list references one of the data buffers residing in the cache memory. A memory address to a data buffer is computed based on one of the stripe buffer list entries. The memory address references a starting data buffer in the cache memory. The data is read from the starting data buffer at the memory address.

Another implementation provides a system for writing data in a storage transaction to one or more data buffers residing in a cache memory. A stripe buffer list is associated with the storage transaction and is aligned with a virtual stripe of a storage device. Each stripe buffer list entry in the stripe buffer list references one of the data buffers residing in the cache memory. An address generator computes a memory address to a data buffer based on one of the stripe buffer list entries. The memory address references a starting data buffer in the cache memory. A data buffer manager stores the data to the starting data buffer at the memory address.

Yet another implementation provides a system for reading data in a storage transaction from one or more data buffers residing in a cache memory. A stripe buffer list is associated with the storage transaction and is aligned with a virtual stripe of a storage device. Each stripe buffer list entry in the stripe buffer list references one of the data buffers residing in the cache memory. An address generator computes a memory address to a data buffer based on one of the stripe buffer list entries. The memory address references a starting data buffer in the cache memory. A data buffer manager reads the data from the starting data buffer at the memory address.

Other implementations are also described and recited herein.

BRIEF DESCRIPTIONS OF THE DRAWINGS

DETAILED DESCRIPTIONS

In one implementation, a storage controller uses stripe-aligned metadata to describe data buffers in the storage controller's cache. A stripe buffer list and other metadata structures are aligned to stripe boundaries on storage media. Each stripe buffer list references data buffers in the cache memory of the storage controller that are dedicated to storing the data associated with a full disk stripe during a storage transaction. Individual data buffers may be fully or partially populated with data for a given storage transaction. A stripe buffer descriptor table associates each stripe buffer list with the corresponding disk stripe through a virtual block address range. A stripe buffer list "present bits" table and a stripe buffer list "dirty bits" table maintain a record of the state of individual data buffers. With these metadata structures, data buffers in cache memory are effectively aligned with virtual disk stripes of the storage media, making for a more simpler and efficient storage transaction.

Figure 1:
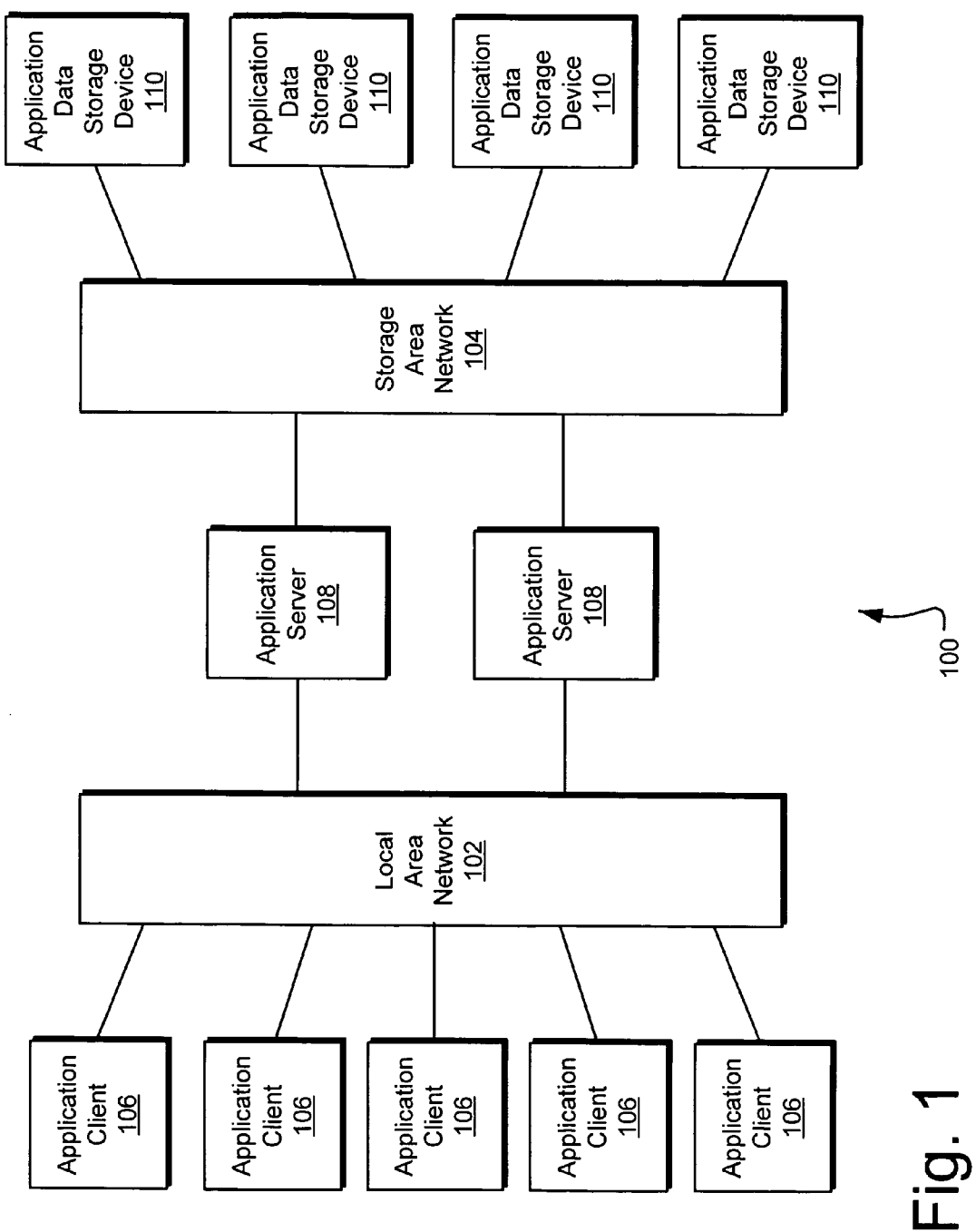
FIG. 1 illustrates an exemplary computing and storage framework including a local area network (LAN) and a storage area network (SAN).

FIG. 1 illustrates an exemplary computing and storage framework 100 including a local area network (LAN) 102 and a storage area network (SAN) 104. Various application clients 106 are networked to application servers 108 via the LAN 102. The application servers 108 allow the application clients 106 to access applications that are resident on the application servers 108. Such applications may depend on data (e.g., an email database) stored at one or more of the application data storage devices 110. Accordingly, the SAN 104 provides connectivity between the application servers 108 and the application data storage devices 110 to allow the application to access the data.

The SAN 104 includes one or more storage controllers, which include intelligent storage processor boards having typically two intelligent storage processors (ISPs) for redundancy. The storage controllers interface the storage devices 110 to the rest of the SAN switch fabric in the SAN 104. Each storage controller can provide assorted storage services, such as routing, volume management, data migration and replication, implemented in various combinations of hardware, firmware, and/or application software and executed by the ISP and/or a related processor.

The SAN 104 shown in FIG. 1 includes storage controllers having ISPs that implement a stripe buffer list configuration for describing data in a storage system cache. The data in the cache is associated with a particular disk stripe by stripe buffer lists. Each stripe buffer list and other related metadata structures are aligned with individual disk stripes, as described in more detail with regard to subsequent figures.

Figure 2:
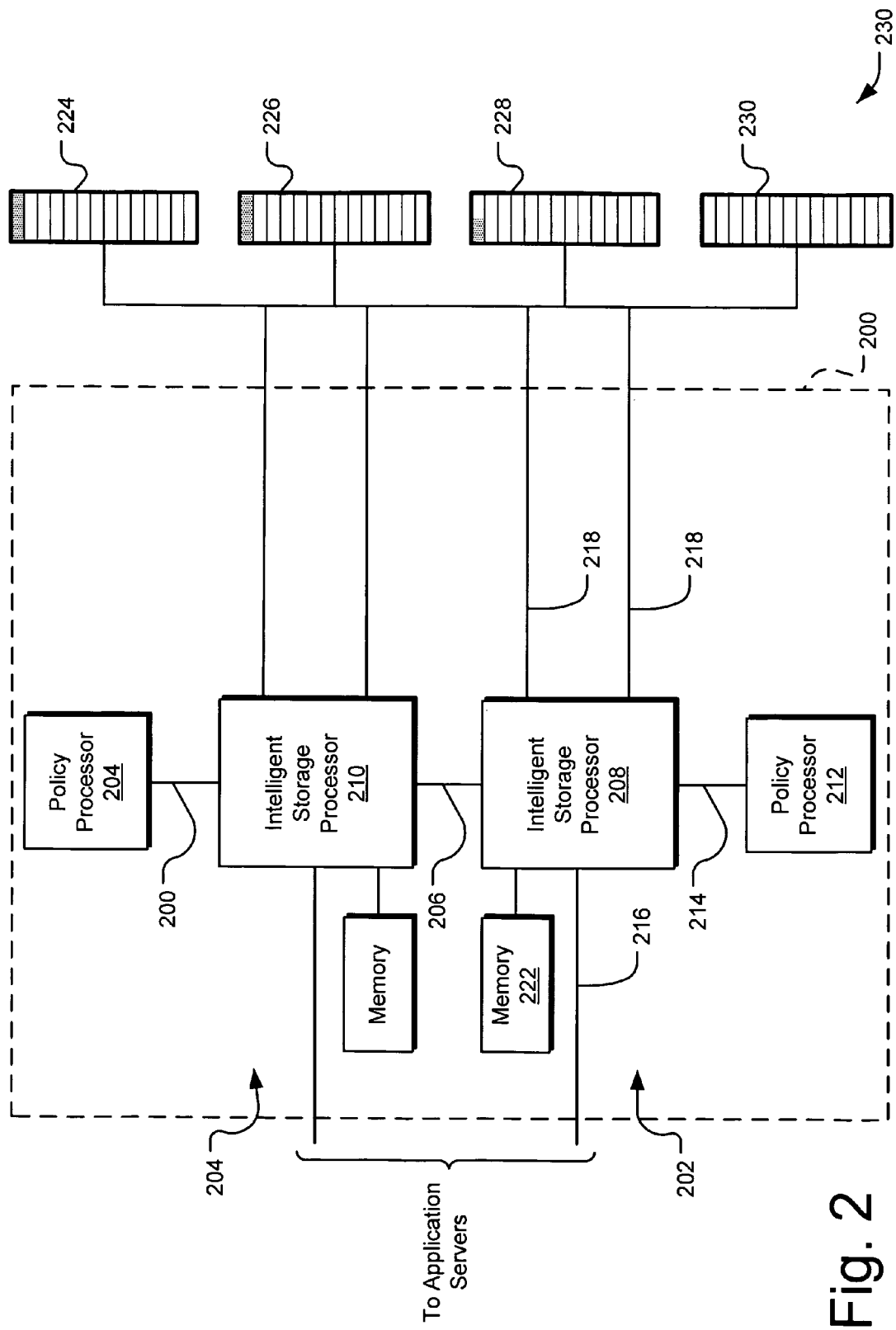
FIG. 2 illustrates a block diagram of an exemplary intelligent storage processor board of a storage controller.

FIG. 2 illustrates a block diagram of an exemplary intelligent storage processor board 200 of a storage controller. The ISP board 200 includes two ISP subsystems 202 and 204 coupled by a 16-bit (or less) wide parallel low voltage differential (LVD) bus 206 (the "e-bus"). The ISP subsystem 202 includes an ISP 208, which includes interfaces to one fibre channel host link 216 with an application server and two fibre channel storage links 218 with disks 220, 222, 224, and 226, and a policy processor 212 executing a real-time operating system (RTOS). The ISP 208 and the policy processor 212 can communicate via a PCI bus 214, and both the ISP 208 and the policy processor 212 can access memory 222.

In one implementation, the ISP 208 includes seven function controller cores (FCCs) with different custom logic and three list manager (LM) special purpose processors. The FCCs and the LMs communicate via a cross point switch (CPS) FCC-LM message crossbar. As such, the FCCs can generate CPS messages in response to a given condition and send these messages through the CPS to a list manager in order to access a memory module or invoke a desired ISP action. Likewise, responses from a list manager may be communicated to an FCC via the CPS. A policy processor may also communicate with the list managers and access memory using the CPS. It should be understood that other implementations may also be employed.

An FCC is a specialized processor capable of executing customized logic based on a particular function. An FCC contains a highly flexible feature set and a powerful interface for accessing memory through the CPS using CPS messages to communicate with the list managers. A list manager is a specialized message processor that can act as an access point to memory for the FCCs of the ISP 208 and its partners, ISP 210, as well as the policy processor 212. A list manager can also provide other specialized functionality responsive to messages received through the CPS. Received messages and data are stored in lists maintained and accessed by the list manager. According to a scheduling protocol, the list manager executes operations defined by the messages.

The policy processor 212 can be programmed by a storage controller vendor to provide "value-add" functionality. That is, the policy processor 212 can execute custom logic to perform sophisticated operations via the ISP 208. In many ways, the policy processor 212 is treated by the ISP 208 as somewhat equivalent to an FCC. The policy processor 212 can send messages to any list manager and receive responses back from any list manager, all via the CPS. A message response issued by the ISP can result in a PCI write to the policy processor 212. In this manner, the policy processor 212 can also access memories 222 and trigger actions within the ISP 208 using CPS messages and the list managers.

Accordingly, a storage controller vendor can create custom storage service applications for execution on the policy processor 212. The storage service applications can access the functionality of the ISP 208 through ISP register access and DMA over the PCI bus 214, such as by opening and accessing memory windows via individual PCI read or write operations with the attendant overhead. Some implementations may also support a faster access than individual PCI access. In an implementation of the described system, for example, the policy processor is implemented with a PowerPC processor that accesses the ISP functionality through cache writes across the PCI bus 214, although other processors and access methods may be employed.

In order to achieve enhanced performance and fault tolerance, many storage controllers are configured to support some level of RAID—Redundant Array of Independent (or Inexpensive) Disks. For example, RAID, Level 0 provides data striping (spreading out blocks of each file across multiple disk drives) but does not provide redundancy. Accordingly, RAID, Level 0 improves performance but does not deliver fault tolerance. If one drive fails, then all data in the array on the failed drive is lost. In contrast, a commonly used implementation of RAID, Level 4 provides block-level striping and a dedicated parity disk. If a data disk fails, the parity data is used to create a replacement disk. Other combinations of striping and redundancy are available at other levels of RAID.

More specifically, striping allocates portions of multiple disks for storage hardware to access the disks in parallel. For example, rather than reading a large file from a single hard disk, it is much faster to chop it up into "pieces", store some of the pieces in "stripes" on each of the drives in a disk array, and then use all the disks to read back the file in parallel when needed. For example, a storage controller may be coupled to striped disks 224, 226, 228, and 230 in a disk array 232, wherein individual stripes are schematically represented in each drive. The storage controller has written contiguous data in stripes across three disks, 224, 226, and 228. Specifically, the first stripe on disk 224 is completely written, the first stripe on disk 226 is completely written, and the first stripe on disk 228 is partially written. When the data is read from the disk array 232, the data can be read from disks 224, 226, and 228 in parallel. In addition, depending on the striping scheme, one or more additional parity disks may also be employed to provide recovery of data in case one of the data drives.

A disk stripe is the basic building block used to virtualize a range of blocks representative of a given set of Virtual Block Addresses (VBAs) or parity for some collection of data disk stripes. The VBAs are mapped to Logical Block Addresses (LBAs), which specify stripe locations on the physical storage media. Storage requests and responses are communicated relative to VBAs, and a media-side component of the storage controller maps the VBAs to and from LBAs during physical media access. A VBA can also include an offset into a given stripe, so as to allow for partial population of the stripe. The ISPs 208 and 210 implement a stripe buffer list configuration for describing data in the storage system cache that is associated with a particular disk stripe. The data buffers act as cache lines. Accordingly, each stripe buffer list references a plurality of data buffers in which data read from or destined to a particular disk stripe is cached. Furthermore, each stripe buffer list is aligned with a virtual disk stripe, such that the starting VBA of the stripe buffer list is evenly divisible by the disk stripe size and the maximum amount of buffer space referenced by the stripe buffer list corresponds to the disk stripe size. In one implementation, each data buffer is sized to 2112 bytes and is capable of holding 4 sectors of file data, although other sizes are also contemplated.

Figure 3:
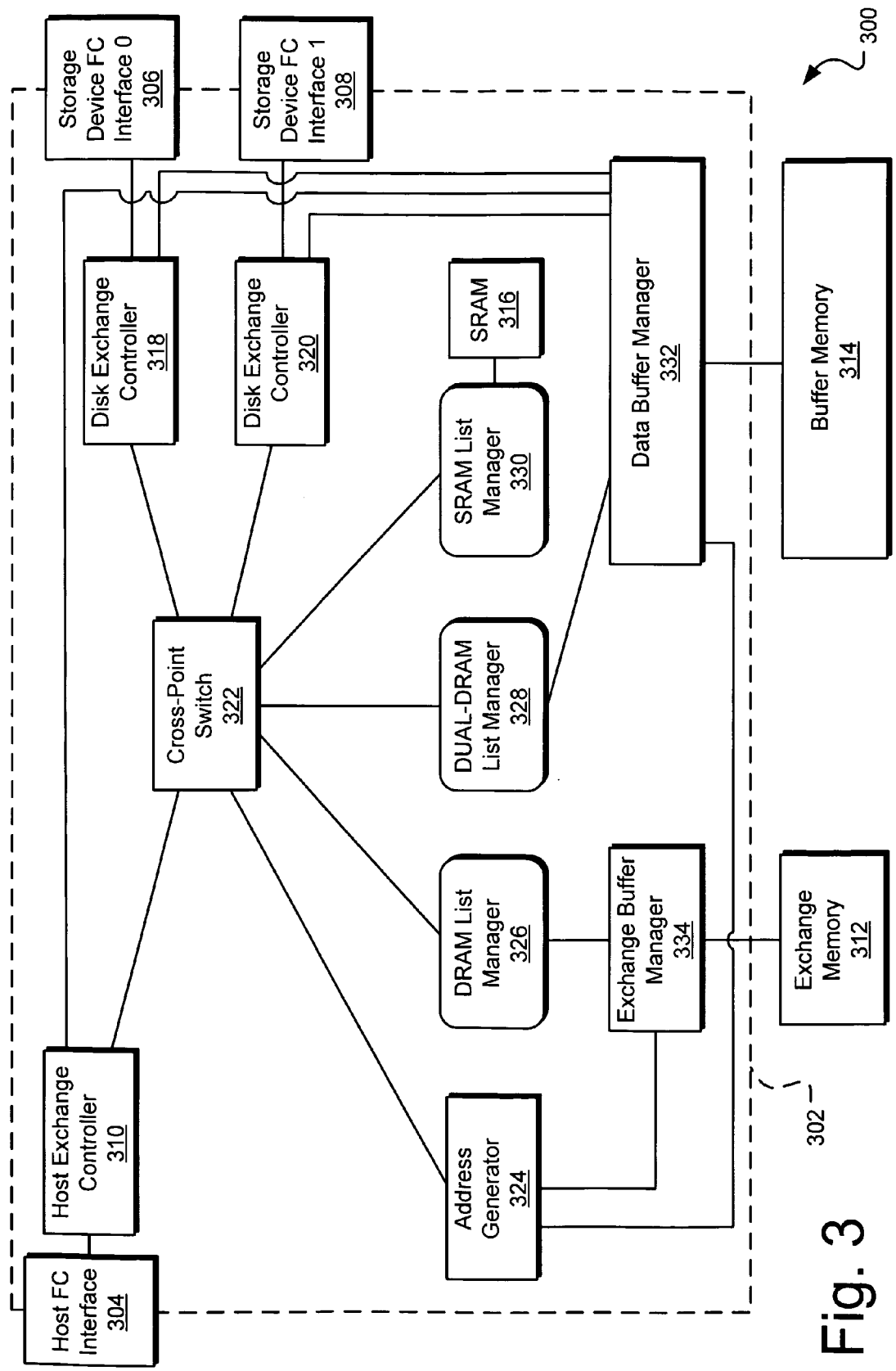
FIG. 3 illustrates components of an exemplary storage controller.

FIG. 3 illustrates components of an exemplary storage controller 300. Among other components, an ISP 302 is coupled through a host fibre channel interface 304 to a host (e.g., an application server) and through one or both of the storage device FC interfaces 306 and 308 to one or more storage devices. The ISP 302 communicates storage exchanges (e.g., Small Computer System Interface (SCSI) exchanges) between the host and the storage devices. It should be understood that other network connectivity may also exist between the host and the storage devices.

For an exemplary storage request (e.g., a SCSI write request), a request frame is received over the host fibre channel interface 304. The host fibre channel interface 304 passes the request data from the request frame via a DMA channel to the host exchange controller 310, which is an FCC dedicated to servicing the host fibre channel interface 304. The request data includes a fibre channel "Origin eXchange IDentifier" (OXID), which identifies a given fibre channel "exchange". An exchange represents a sequence of one or more non-concurrent related requests and responses passing between a pair of Fibre Channel ports, encapsulating a "conversation," such as a SCSI task. Exchanges may be bidirectional and may be short or long lived. The OXID is extracted from the request frame and used to process the request data.

A counterpart to the OXID is the "Responder eXchange IDentifier" (RXID), which identifies the context to be used when responding to the request. For example, a data frame from one of the storage devices through the storage device FC interface 0 306 or storage device FC interface 1 308 is processed by the corresponding disk exchange controller 318 or 320. The RXID is extracted from the data frame and used to locate the context needed to route the response data.

Each of the controllers 310, 318, and 320 can access memory and other functionality through a cross-point switch (CPS) 322. A controller can directly stream data to and from data FIFOs of the data buffer manager 332 and can exchange CPS messages through the CPS 322 with an address generator 324, DRAM list manager 326, a dual-DRAM list manager 328, and an SRAM list manager 330. The address generator 324 calculates addresses for controllers accessing the buffer memory 314 through the data buffer manager 332 and the exchange memory 312 through the exchange buffer manager 334. For both host exchange controllers and disk exchange controllers, the address generator 324 is programmed with the SBL table base addresses the number of bytes for an SBL entry, the size of the SBL, and the size of an individual data buffer.

Collectively, OXIDs and RXIDs are referred to as "exchange identifiers", although other exchanges identifiers may also be employed. In one implementation, the exchange identifier is used to locate a context for a given exchange. The context provides continuity among individual frames in a single exchange. For example, when an exchange is initiated for a SCSI write command, a context is established for the exchange. In addition, the receiving controller allocates or locates an SBL, an SBLD, an SPB, and an SDB for the associated stripe and populates the appropriate portion of the SBL using available data buffers from buffer memory. For subsequent stages in the exchange, the storage system can retrieve the context from memory using the exchange identifier and continue processing the exchange using the context data. When the exchange is complete, the metadata structures and data buffers for the exchange may be maintained for some time to act as a write-back cache—as long as the cached data remains valid, the storage controller can service a read request from its cache, rather than retrieving the data from physical storage. The validity of cached data is managed using known caching techniques.

In one implementation, the exchange identifier is used to look up a context data structure for the current exchange. Context structures for each existing exchanges are stored in the SRAM 316 and identify metadata in the exchange memory 312 that describes the data buffers in the storage system cache that are associated with a particular disk stripe in each exchange.

A primary metadata structure in the described configuration is a stripe buffer list. The storage system can maintain a large number of stripe buffer lists in the exchange memory 312, and in one implementation, the stripe buffer lists are allocated to distinct pools (e.g., a primary pool and a secondary pool) to support mirroring (e.g., mirroring between the storage devices coupled to storage device FC interfaces 306 and 308). The various stripe buffer lists are structured as an array, so a context structure can specify an index ("SBL index") of the appropriate stripe buffer list.

The context structure also specifies a "mirror" flag that indicates to which pool of data buffers and metadata the exchange is designated. If the mirror flag indicates '0', then the storage controller caches the data using a stripe buffer list from its primary pool having the SBL index given by the context. If the mirror flag indicates '1', then a stripe buffer list from its secondary pool is used. As such, the SBL index, and the mirror flag are used to access the appropriate stripe buffer list from the exchange memory 312 and other associated metadata. In one implementation, other associated metadata may include without limitation a stripe buffer list descriptor table ("SBLD table"), a stripe buffer list present bits table ("SPB table"), and a stripe buffer list dirty bits table ("SDB table").

The context structure also specifies the starting sector "offset" within the disk stripe associated with the exchange. The offset, therefore, also specifies an offset into the stripe buffer list. In this manner, the storage controller is able to determine where in the stripe buffer list to begin processing (e.g., writing data to certain data buffers referenced by the stripe buffer list or reading data from certain data buffers referenced by the stripe buffer list).

The other metadata structures, the SBLD table, the SPB table, and the SDB table, govern how the data buffers are associated with the storage media and how the data buffers are handled by the caching mechanisms. The SBLD table includes entries that associate individual SBLs with ranges of VBAs (i.e., with a virtual disk stripe) on a given logical unit. A given SBLD table entry is referenced by the same SBL index used to identify the appropriate SBL for a given exchange. In one implementation, there are two SBLD tables stored in the exchange memory 312, one for each pool. The two SBLD tables are adjacent and contain the same number of entries as the two SBL tables in the exchange memory 312.

An exemplary format for an eight-byte SBLD table entry is shown below:

TABLE 1

SBLD table entry format

| Byte Location | Description | Address Bit Locations |
|---|---|---|
| 0 | VBA High (stripe-aligned) | [31:16] |
| 2 | VBA Low (stripe-aligned) | [15:0] |
| 4 | Logical Unit ID | |
| 6 | State | |

The state field in the exemplary SBLD table entry is defined as:

TABLE 2

State field format for SBLD table entry

| Bit Locations | Descriptions [Polarity] |
|---|---|
| 0x4000 | DIF Invalid for Some Blocks [1] |
| 0x3000 | Data Column for Parity |
| 0x0800 | Parity Data [1] |
| 0x0400 | Flush Before Copy [1] |
| 0x0200 | In Use [1] |
| 0x01FF | Dirty Block Count |

Another metadata structure is called an SPB table. For each SBL entry, there is also a corresponding entry in one of two associated SPB tables. In one implementation, there are two SPB tables stored in the exchange memory 312, one for each pool. The two SPB tables are adjacent and contain the same number of entries as the two SBL tables in the exchange memory 312.

Again, an SPB entry is indexed using the SBL index and the table is selected using the "mirror" flag in combination with a pool flag. Each SPB table entry consists of 256 bits and is structured as 16 2-byte fields. Each bit indicates whether the sector data for a corresponding VBA is "valid" or about to be "valid". The particular bit in a given field is referenced using a right shift of the value 0x8000 based on the lower order 4 bits of the VBA for the given sector. A bit mask for a range with a given starting VBA and a length L within a given field is computed as:

MASK=(0xFFFF<<(16−L))>>(VBA&15)

The particular field for a given VBA is computed as:

INDEX=(VBA>>4)&15

Another metadata structure is called an SDB table. For each SBL entry, there is also a corresponding entry in one of two associated SDB tables. In one implementation, there are two SDB tables stored in the exchange memory 312, one for each pool. The two SDB tables are adjacent and contain the same number of entries as the two SBL tables in the exchange memory 312.

Again, an SDB entry is indexed using the SBL index and the table is selected using the "mirror" flag in combination with a pool flag. Each SDB table entry consists of 256 bits and is structured as 16 2-byte fields. Each bit indicates whether the sector data for a corresponding VBA is "dirty" (i.e., Write Back Cached) and, therefore, needs to be flushed out of the cache in the buffer memory 314. The particular bit in a given field is referenced using a right shift of the value 0x8000 based on the lower order 4 bits of the VBA for the given sector. A bit mask for a range with a given starting VBA and a length L within a given field is computed as:

MASK=(0xFFFF<<(16−L))>>(VBA&15)

The particular field for a given VBA is computed as:

INDEX=(VBA>>4)&15

The context data is communicated from the controller through the CPS to the address generator 324, which computes the appropriate address in the exchange memory 312 for the appropriate SBL, based on the SBL index and pool. In one implementation, the context is communicated to the address generated in a message packet that includes without limitation the SBL index, an SBL offset (which identifies the offset into the SBL from which the first valid buffer index is read), a sector offset (which indicates the starting sector within the first valid data buffer), and a sector count (which represents the number of sectors to be transferred from the controller to the buffer memory 314). For example, with 32 sectors per data buffer, the SBL offset corresponds to VBA [10:5] and the starting sector index corresponds to VBA[4:0]. With 4 sectors per data buffer, the SBL offset corresponds to VBA[7:2] and the starting sector index corresponds to VBA[1:0].

Responsive to receipt of the context, the address generator 312 decodes the message packet and accesses the identified SBL in the exchange memory 312, according to the SBL offset, to obtain the specified data buffer index. Then, using the data buffer index and the sector offset, the address generator 324 then computes a data buffer memory address. The sector offset and the number of sectors in a buffer are used to determine the remaining number of sectors in the data buffer. The transfer size associated with the data buffer memory address is the lesser of the remaining data buffer space and the total transfer size (stored in the message packet). The data buffer address and the transfer size are written to an address FIFO of the data buffer manager 332. If the controller (e.g., 310, 318, or 320) has sent the frame data to the data FIFO of the data buffer manager 332, the data buffer manager 332 begins loading the data into the appropriate data buffer (based on the address in the address FIFO) in the buffer memory 314.

Figure 4:
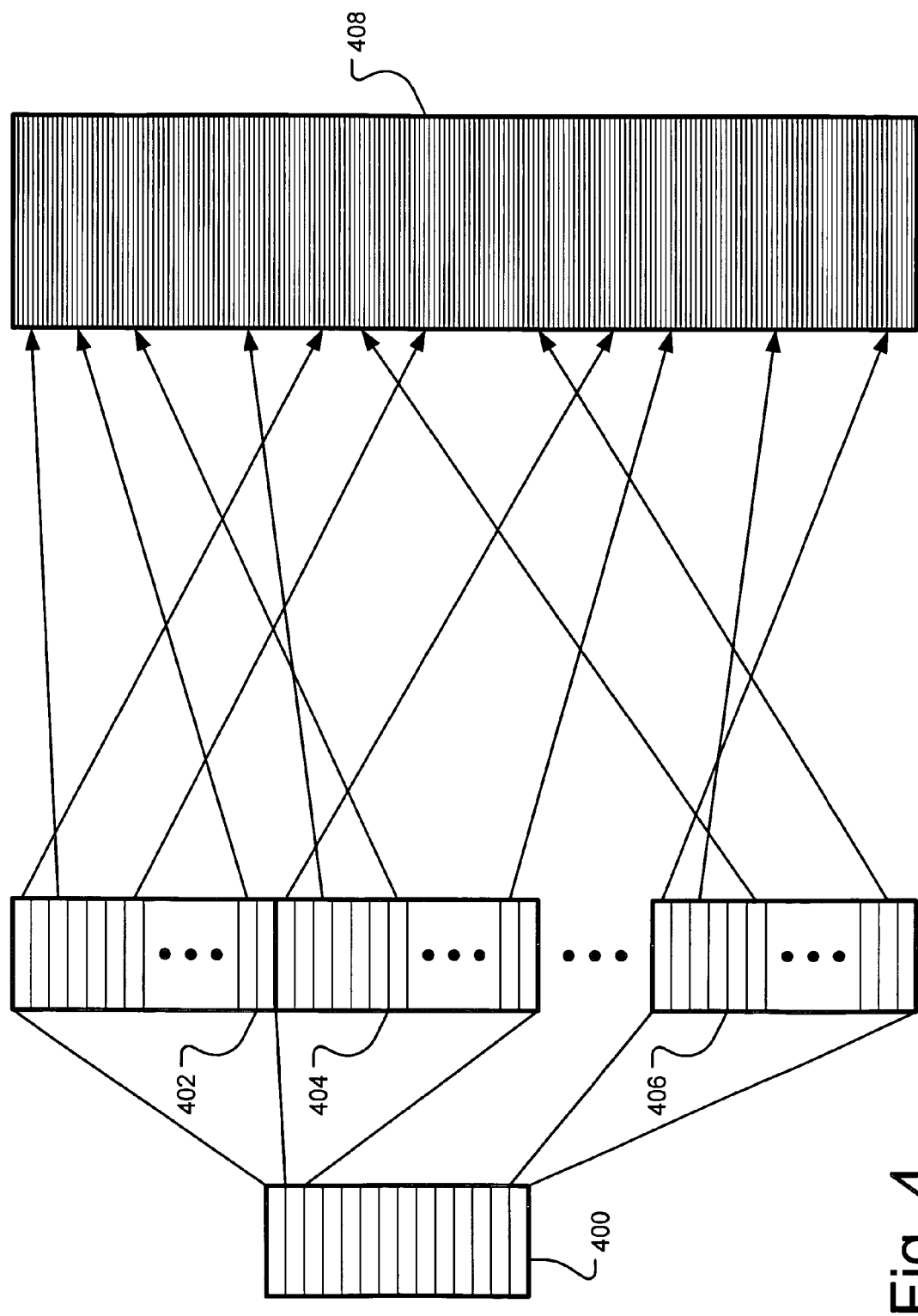
FIG. 4 illustrates exemplary stripe buffer lists tables and data structures.

FIG. 4 illustrates exemplary stripe buffer lists tables and data structures. An SBL table 400 stores a plurality of SBL structures 402, 404, and 406, one SBL structure for each stripe on the storage media for which there is data in the cache. Each SBL structure includes a number of data buffer indices, each of which reference into a data buffer region of the buffer memory 408.

As described above, each SBL structure is aligned with a virtual disk stripe and one or more physical disk stripes on target storage media. When the storage controller receives data (whether from a host or from a storage device), the data is stored by the receiving controller (i.e., FC interface) in frame buffers organized as a FIFO. The FCC then sends a message to the appropriate address generator (AG) logic through the CPS. The message provides the information necessary to identify which SBL to use and where to start within the SBL. The data needed to construct the message is located using the exchange ID extracted from the frame header. The data in the frame is moved to memory. In a similar fashion, when the storage controller transmits data (whether to a host or to a storage device), the transmitting controller (i.e., FCC) extracts the context from the request data provided by the policy processor. Again, a message sent to the AG logic through the CPS provides the information necessary to identify which SBL to use and where to start within the SBL.

Figure 5:
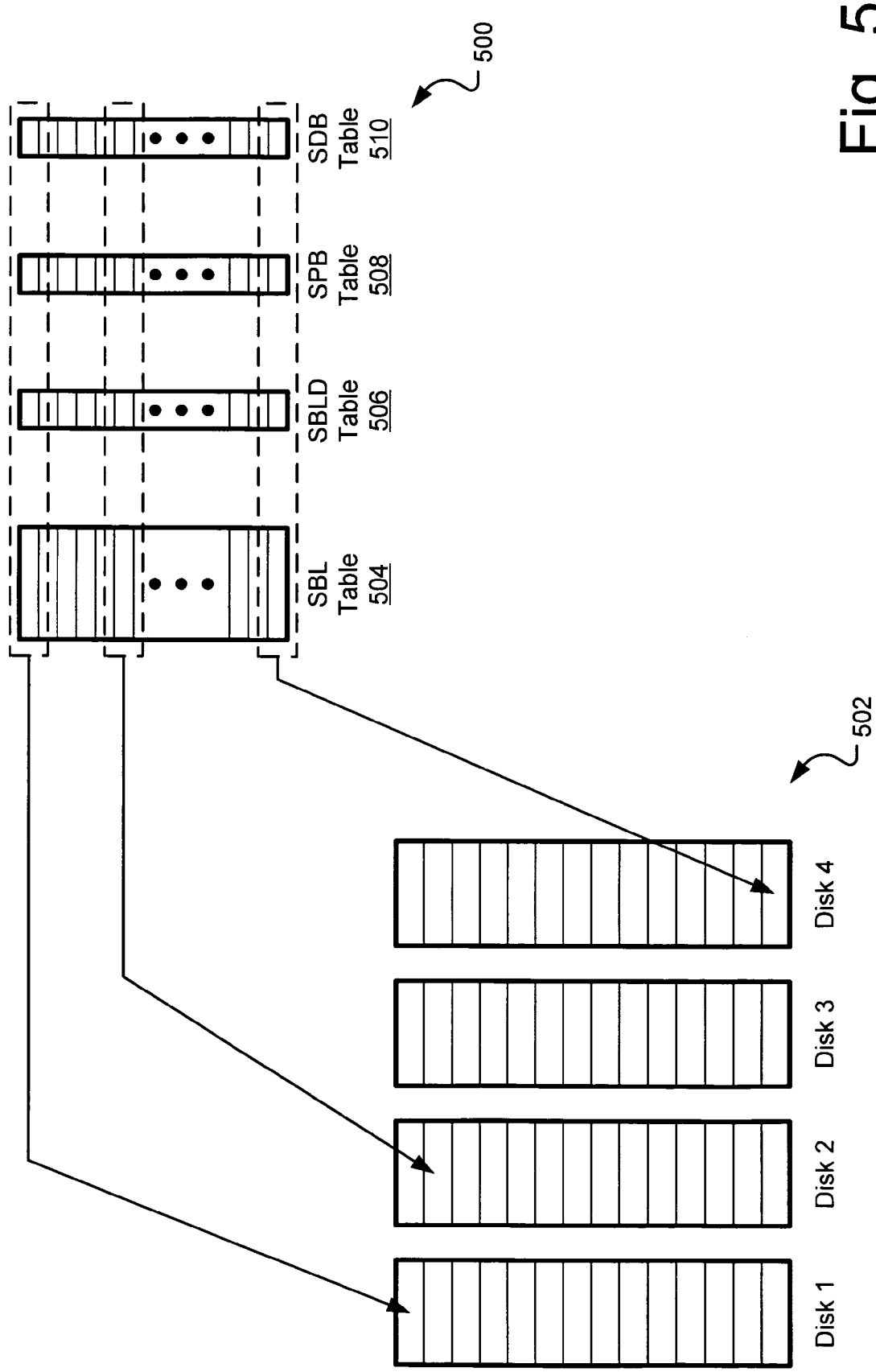
FIG. 5 illustrates exemplary alignment of metadata structures with virtual disk stripes.

FIG. 5 illustrates exemplary alignment of metadata structures 500 with virtual disk stripes. Four striped storage disks 502 are managed in accordance with the metadata structures 500. The SBL table 504 includes a plurality of SBLs, any of which may be valid or invalid at any given time. Each SBL is aligned with a given virtual stripe on a storage medium and includes one or more buffer indices referencing data buffers in the buffer memory. The SBLD table 506 includes an entry for each SBL and specifies the VBA range and other characteristics associated with each SBL. The illustrated alignment is based on the starting VBA of the stripe corresponding to the starting VBA associated with the SBL. The maximum amount of data addressed by the SBL's data buffers corresponds to the virtual disk stripe size.

The SPB table 508 and a SDB table 510 allow for cache management of the data buffers. The SPB table 508 includes a bit for each sector of each SBL to indicate whether the cached data for a given sector is or is about to be valid (i.e., has current data for the corresponding sector). It also indicates that the buffer index is valid. In subsequent exchange requesting a read operation to the same sector, if the SPB table 508 indicates that the data is valid, then the request can be serviced from the buffer memory instead of requiring a round trip to the storage medium. The SDB table 510 includes a bit for each sector of the SBL to indicate whether the cached data for a given sector is "dirty" (i.e., needs to be written from the data buffer). For example, if the storage controller loses power in the middle of an exchange, the SDB table 510 can be used to indicate that the data in the cache needs to be flushed to the appropriate target. Therefore, when the storage controller reboots, data integrity is maintained in the presence of a catastrophic event.

The SPB table 508 and SDB table 510 combined represent the logic shown below. The "present and dirty, but CRC invalid" state represents a condition where the data in the data buffers contain modified data (e.g., the CRCs do not match what is expected). In such a case, the CRC needs to be recomputed and updated.

TABLE 3

Present Bits and Dirty Bits Logic

| Present | Dirty | Description |
|---------|-------|-------------|
| 0 | 0 | Unused |
| 0 | 1 | Valid and dirty, but CRC invalid |
| 1 | 0 | Valid but not dirty |
| 1 | 1 | Valid and dirty |

Figure 6:
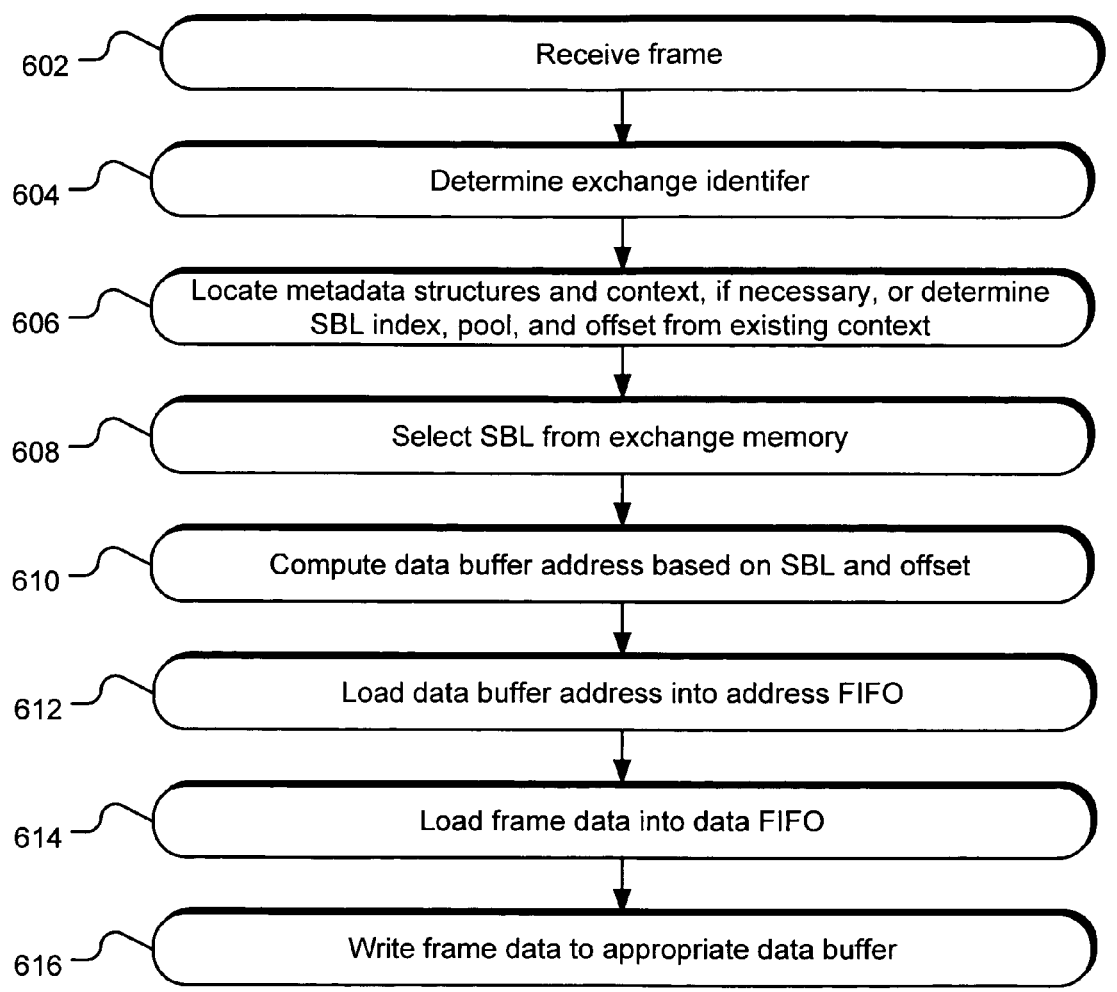
FIG. 6 illustrates logical operations in an exemplary storage system employing stripe buffer lists in a receiving stage.

FIG. 6 illustrates logical operations 600 in an exemplary storage system employing stripe buffer lists in a receiving stage. A receiving operation 602 receives a data frame. In an exchange operation 604, an FCC (e.g., a host exchange controller or a disk exchange controller) determines the exchange identifier from the data frame. A context operation 606 locates a context and appropriate metadata structures for the exchange.

A selection operation 608 uses the SBL index and pool data from the context to select the appropriate SBL from the exchange memory. A computation operation 610 selects the appropriate SBL entry based on the SBL offset and uses the SBL entry and the sector offset to compute the memory address for the starting data buffer of the write operation (for the current frame). The computation operation 610 also computes the transfer size based on the metadata and context data.

A loading operation 612 loads the memory address into the address FIFO of the buffer manager for the buffer memory (where the data buffers reside). If the FCC is ready to transfer data, a loading operation 614 transfers the frame data from the receiving FCC to the data FIFO of the buffer manager for the buffer memory. A write operation 616 writes the transferred frame data from the data FIFO to the memory address loaded in the address FIFO (incrementing the address as the write takes place).

Figure 7:
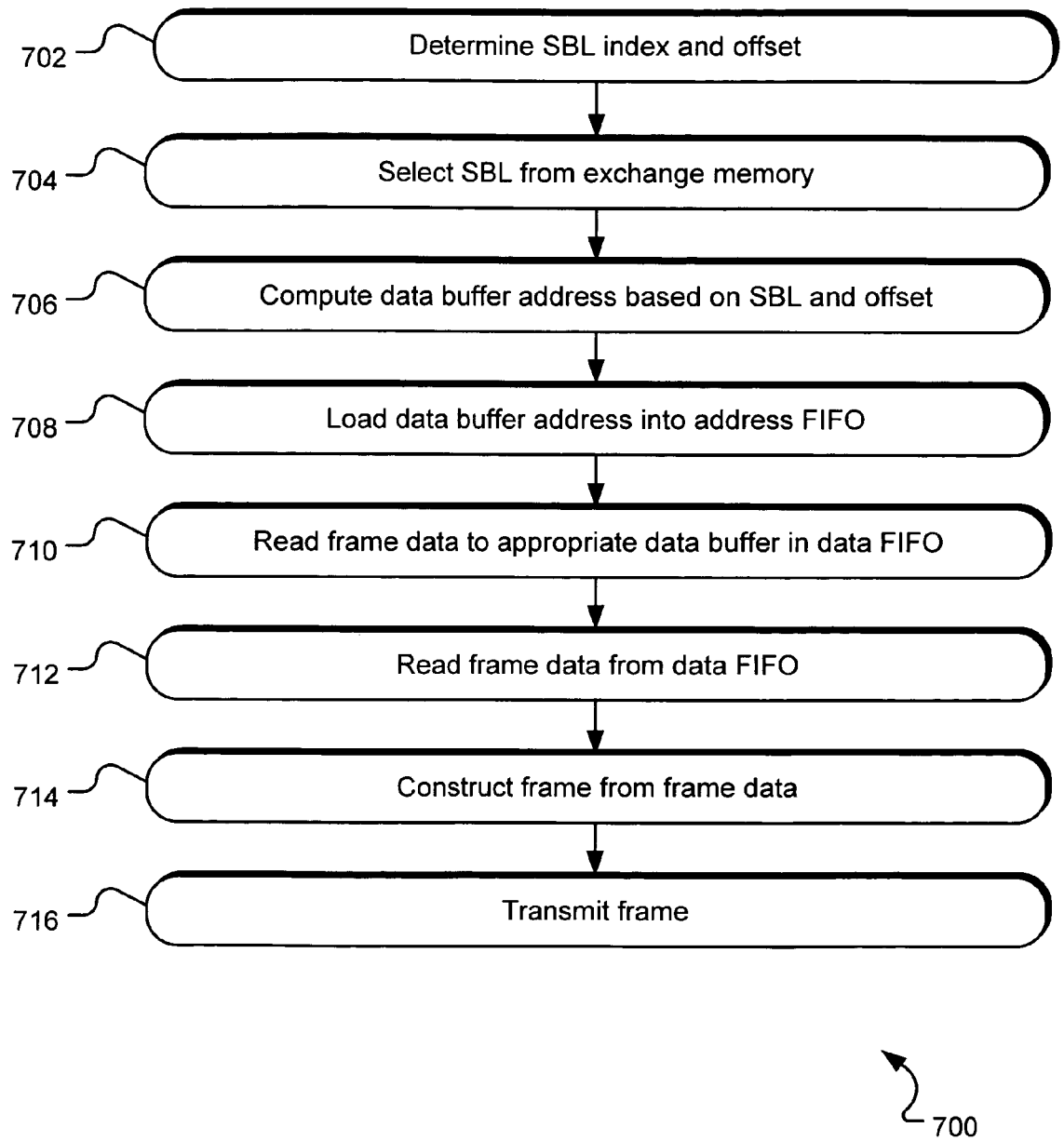
FIG. 7 illustrates logical operations in an exemplary storage system employing stripe buffer lists in a transmitting stage.

FIG. 7 illustrates logical operations 700 in an exemplary storage system employing stripe buffer lists in a transmitting stage. In a request data extraction operation 702, the transmitting controller determines the SBL index, pool data and offset. This data may be sent to the transmitting controller in a CPS message from the policy processor.

A selection operation 704 uses the SBL index and pool data from the context to select the appropriate SBL from the exchange memory. A computation operation 706 selects the appropriate SBL entry based on the SBL offset and uses the SBL entry and the sector offset to compute the memory address for the starting data buffer of the read operation (for the current frame). The computation operation 706 also computes the transfer size based on the metadata and context data.

A loading operation 708 loads the memory address into the address FIFO of the buffer manager for the buffer memory (where the data buffers reside). A loading operation 710 loads the data from the data buffer at the memory address into the data FIFO of the buffer manager for the buffer memory. If the FCC is ready to transfer data, a reading operation 712 transfers the frame data from the data FIFO of the buffer manager for the buffer memory to the transmitting FCC.

A framing operation 714 constructs a frame (e.g., a fibre channel frame) from the frame data received from the data FIFO. In a transmitting operation 716, the frame is transmitted to its destination (e.g., a host or a storage device), which can decipher the frame to handle it properly (e.g., to receive the data from the stripe or to write the data to the stripe).

The embodiments of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, unless explicitly claimed otherwise or a specific order is inherently necessitated by the claim language.

The above specification, examples and data provide a complete description of the structure and use of exemplary embodiments of the invention. Since many embodiments of the invention can be made without departing from the spirit and scope of the invention, the invention resides in the claims hereinafter appended. In particular, it should be understand that the described technology may be employed independent of a storage system. Other embodiments are therefore contemplated.

What is claimed is:

1. A method of locating data in a storage transaction involving one or more data buffers residing in a cache memory, the method comprising:
   obtaining a stripe buffer list associated with the storage transaction, wherein the stripe buffer list is aligned with a stripe of a storage device and at least one stripe buffer list entry in the stripe buffer list references one of the data buffers residing in the cache memory;
   computing a memory address in a data buffer based on one of the stripe buffer list entries, the memory address referencing the data buffer in the cache memory; and
   accessing data in the data buffer based on the memory address.

2. The method of claim 1 wherein the stripe is of a specified size and further comprising:
   associating the stripe buffer list with a virtual block address, wherein the virtual block address is evenly divisible by the specified size of the stripe.

3. The method of claim 1 wherein the stripe is of a specified size and further comprising:
   associating the snipe buffer list with a parity block address, wherein the parity block address is evenly divisible by the specified size of the stripe.

4. The method of claim 1 wherein the stripe is of a specified size and the stripe buffer list references data buffers that are sized to equal the specified size of the stripe.

5. The method of claim 1 further comprising:
   constructing a stripe buffer list descriptor, wherein an entry in the stripe buffer list descriptor associates the stripe buffer list with a stripe of the storage device.

6. The method of claim 1 further comprising:
   constructing a stripe buffer list present bits structure, wherein an entry in the stripe buffer list present bits structure identifies valid sector data in data buffers referenced by the stripe buffer list.

7. The method of claim 1 further comprising:
   constructing a stripe buffer list dirty bits structure, wherein an entry in the stripe buffer list present bits structure identifies dirty sector data in data buffers referenced by the stripe buffer list.

8. The method of claim 1 further comprising:
   obtaining an offset value representing a location for the data within the stripe, wherein the accessing operation accesses the data buffer associated with the memory address and further offsets into the data buffer based on the offset value to access the data.

9. A system for locating data in a storage transaction involving one or more data buffers residing in a cache memory, the system comprising:
   a stripe buffer list associated with the storage transaction, wherein the stripe buffer list is aligned with a stripe of a storage device and at least one stripe buffer list entry in the stripe buffer list references one of the data buffers residing in the cache memory;
   an address generator that computes a memory address in a data buffer based on one of the stripe buffer list entries, the memory address referencing the data buffer in the cache memory; and
   a data buffer manager accessing the data in the data buffer based on the memory address.

10. The system of claim 9 wherein the stripe is of a specified size and further comprising:
    a virtual block address associated with the stripe buffer list, wherein the virtual block address is evenly divisible by the specified size of the stripe.

11. The system of claim 9 wherein the stripe is of a specified size and further comprising:
    a parity block address associated with the stripe buffer list, wherein the parity block address is evenly divisible by the specified size of the stripe.

12. The system of claim 9 wherein the stripe is of a specified size and the stripe buffer list references data buffers that are sized to equal the specified size of the stripe.

13. The system of claim 9 further comprising:
    a stripe buffer list descriptor, wherein an entry in the stripe buffer list descriptor associates the stripe buffer list with a stripe of the storage device.

14. The system of claim 9 further comprising:
    a stripe buffer list present bits structure, wherein an entry in the stripe buffer list present bits structure identifies valid sector data in data buffers referenced by the stripe buffer list.

15. The system of claim 9 further comprising:
    a stripe buffer list dirty bits structure, wherein an entry in the stripe buffer list present bits structure identifies dirty sector data in data buffers referenced by the stripe buffer list.

16. The system of claim 9 further comprising:
    an offset value representing a location for the data within the stripe, wherein the data buffer managers offsets into the data buffer based on the offset value to access the data.

* * * * *